United States Patent
Lu et al.

(10) Patent No.: US 9,703,626 B2
(45) Date of Patent: *Jul. 11, 2017

(54) RECYCLING ERROR BITS IN FLOATING POINT UNITS

(71) Applicants: Intel Corporation, Santa Clara, CA (US); Duke University, Duham, NC (US)

(72) Inventors: Shih-Lien L. Lu, Portland, OR (US); Helia Naeimi, Sunnyvale, CA (US); Ralph Nathan, Durham, NC (US); Daniel Sorin, Durham, NC (US)

(73) Assignees: Intel Corporation, Santa Clara, CA (US); Duke University, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/149,988

(22) Filed: May 9, 2016

(65) Prior Publication Data
US 2016/0253235 A1 Sep. 1, 2016

Related U.S. Application Data

(63) Continuation of application No. 13/676,796, filed on Nov. 14, 2012, now Pat. No. 9,335,996.

(51) Int. Cl.
  *G06F 7/38* (2006.01)
  *G06F 9/30* (2006.01)
  *G06F 11/10* (2006.01)

(52) U.S. Cl.
  CPC ............ *G06F 11/10* (2013.01); *G06F 9/3001* (2013.01); *G06F 9/30014* (2013.01); *G06F 9/30101* (2013.01)

(58) Field of Classification Search
  None
  See application file for complete search history.

(56) References Cited

U.S. PATENT DOCUMENTS

| 2003/0200244 A1 | 10/2003 | Abraham |
| 2006/0179092 A1 | 8/2006 | Schmookler |
| 2009/0300274 A1* | 12/2009 | Luo ................ G06F 3/0611 711/103 |

* cited by examiner

*Primary Examiner* — Hyun Nam
(74) *Attorney, Agent, or Firm* — Lowenstein Sandler LLP (57) ABSTRACT

A mechanism for recycling error bits in a floating point unit is disclosed. A system of the disclosure includes a memory and a processing device communicably coupled to the memory. In one embodiment, the processing device comprising a floating point unit (FPU) to generate a result value from applying an operation on floating point number inputs to the FPU and generate an error value using the result value. The FPU also writes the result value to a first register of the processing device dedicated to storing results from the operation of the FPU and writes the error value to a second register of the processing device dedicated to storing errors from the operation of the FPU. The second register is separate from the first register.

20 Claims, 5 Drawing Sheets

RECYCLING ERROR BITS IN FLOATING POINT UNITS

CROSS-REFERENCE TO RELATED APPLICATIONS

The present application is a continuation of U.S. patent application Ser. No. 13/676,796 filed on Nov. 14, 2012, which is incorporated herein by reference in its entirety.

TECHNICAL FIELD

The embodiments of the disclosure relate generally to processing devices and, more specifically, relate to recycling error bits in floating point units.

BACKGROUND

Computing systems today perform extensive amount of calculations. Developers of applications for computing systems often consider the finite precision of floating point hardware in processor cores and the resulting potential for small inaccuracies to snowball into larger, often glaring, inaccuracies over the course of a long sequence of computations.

Floating point hardware, such as a floating point unit (FPU), is a part of a computer system that is specifically designed to carry out operations on floating point numbers. Floating point refers to a representation of a number where a radix point (decimal point, or, more commonly in computers, binary point) can "float"; that is, can be placed anywhere relative to the significant digits of the number. This position is indicated separately in the internal representation, and floating-point representation can thus be thought of as a computer realization of scientific notation. Typical operations performed by floating point hardware on floating point numbers are addition, subtraction, multiplication, division, and square root. In most general purpose computer architectures, one or more FPUs are integrated with the processor.

Inaccuracies in floating point hardware operations can arise due to finite precision. The floating point unit operates to represent an infinite number of floating point values with a finite number of bits. There are some ways in which computations can become numerically inaccurate in floating point hardware. For example, it may happen due to rounding of results or due to binary/decimal conversion.

Multiple solutions have been utilized to provide numerically accurate floating point operations. One approach includes writing software with accuracy-aware algorithms that explicitly consider the finite precision of each computation. Numerical analysis is an established field, and programmers can write software that tolerates limited precision and provides the desired accuracy. The drawback to accuracy-aware code is that, compared to accuracy-unaware code, it is more complicated and involves more work to perform a given computation, thus consuming additional time and energy of the computer system.

Another approach for achieving numerical accuracy may be to use simple, accuracy-unaware algorithms, but with the greatest precision possible in the hardware. For example, this approach may replace each 32-bit single-precision "float" with a 64-bit double-precision "double." In many situations, this approach provides the target accuracy, yet often incurs extra work (energy and latency) associated with the computation and memory accesses, with little advantage obtained over the less-precise hardware implementation.

Furthermore, both of the approaches mentioned above, namely accuracy-aware algorithms and accuracy-unaware algorithms, result in storing large precision numbers in memory. This increases total power consumption of the computer system because additional memory access power is utilized for such storage.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for recycling error bits in floating point units (FPUs). In one embodiment, an error resulting from each floating point operation performed by an FPU of a processing device is made architecturally visible. The error is the difference between the rounded result produced by the FPU and the result that would have been obtained with a theoretical infinite-precision FPU.

In one embodiment, a system of embodiments of the disclosure includes a memory and a processing device communicably coupled to the memory. In one embodiment, the processing device comprises an FPU to generate a result value from applying an operation on floating point number inputs to the FPU, and generate an error value using the result value. The FPU also writes the result value to a first register of the processing device dedicated to storing results from the operation of the FPU, and writes the error value to a second register of the processing device dedicated to storing errors from the operation of the FPU.

Figure 1:
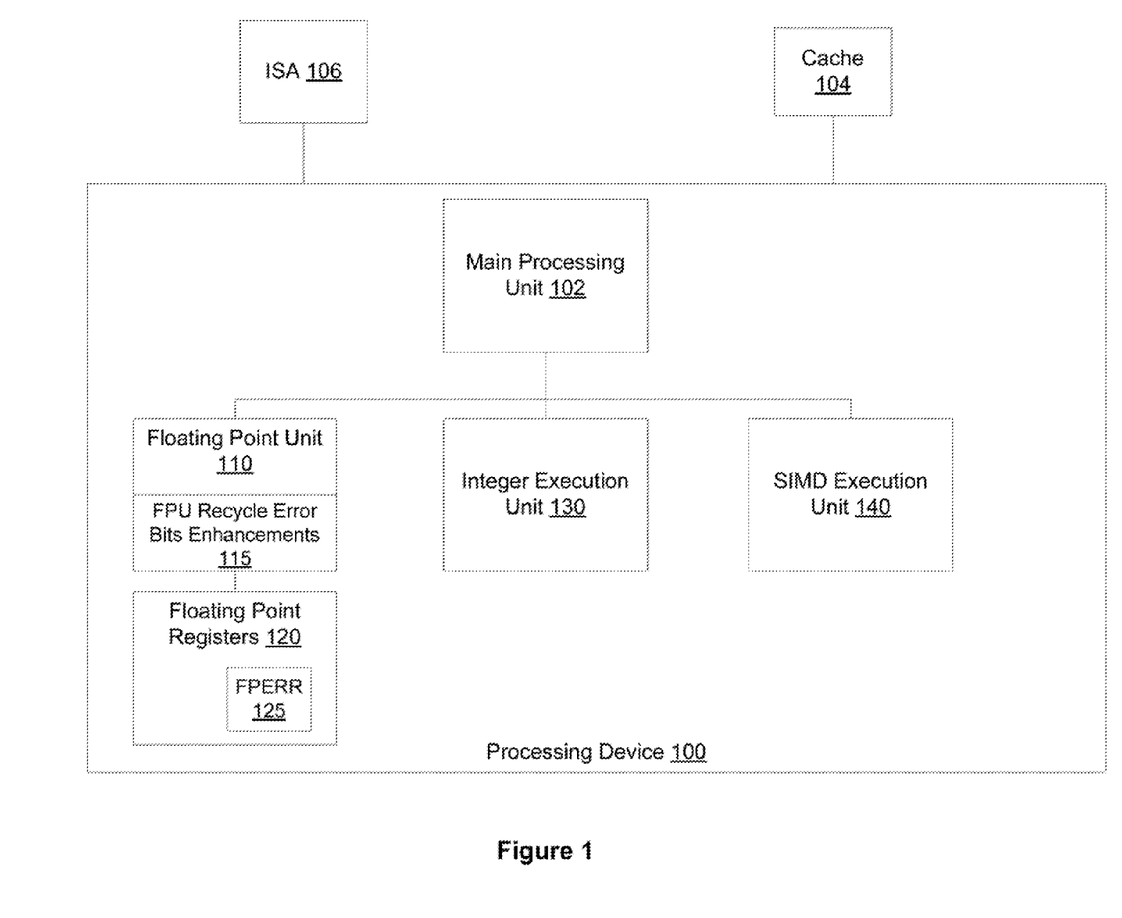
FIG. 1 is a block diagram of one embodiment of a processing device that implements recycling error bits in floating point units (FPUs)

FIG. 1 is a block diagram of one embodiment of a processing device 100 that implements recycling error bits in floating point units. Processing device 100, sometimes referred to as "processor" or "central processing unit (CPU)", includes a main processing unit 102, which executes software instructions. Some of these software instructions use additional processor resources, a floating point unit (FPU) 110, an integer execution unit 130, a single instruction multiple data (SIMD) unit 140, and/or any other processor resources. In one embodiment, FPU 110, integer execution unit 130, and SIMD unit 140 are hardware components. In other embodiments, FPU 110, integer execution unit 130, and SIMD unit may be implemented individually, or as a combination of hardware, software, or firmware. Although each of these processor resources is illustrated inside the processing device 100, any of these and/or other processor resources may be located outside the processing device 100. Furthermore, although a single instance of each of FPU 110, integer execution unit 130, and SIMD execution unit 140 is illustrated, more than one of each component may be included in processing device 100.

Processing device 100 may be communicably coupled to cache 104, which stores data and/or instructions that are used by the main processing unit 102. In one embodiment, cache 104 may be part of a memory, such as random access memory (RAM), communicably coupled to processing device. In other embodiment, cache 104 may reside in processing device 100, such as a Layer 1 (L1) cache or Layer 2 (L2) cache. Main processing unit 102 executes based on instruction set architecture (ISA) 106 of processing device 100. ISA 106 includes microcode that is implemented to achieve a defined set of assembly language instructions that are executed by the processing device 100, including main processing unit 102, and define the architecture of the processing device 100. The architecture of processing device 100 defined by ISA 106 includes, but is not limited to, native data types, instructions, registers, addressing modes, memory architecture, interrupt and exception handling, and external input/output (I/O). ISA 106 includes a specification of a set of opcodes (machine language) and the native commands implemented by processing device 100.

Processing device 100 may execute one or more instructions of a program, such as a program (or portions of a program) stored in cache 104, for example. These instructions may require specialized operations to be performed by one of the FPU 110, integer execution unit 130, or SIMD execution unit 140. Each of these units 110, 130, 140 is specialized to carry out specific operations for the processing device. For example, the integer execution unit 130 performs mathematical operations using integer operands. The SIMD execution unit 140 performs SIMD operations using multiple data operands. The FPU 110 performs mathematical operations using floating-point operands.

Floating point refers to a representation of a number where a radix point (decimal point, or, more commonly in computers, binary point) can "float"; that is, can be placed anywhere relative to the significant digits of the number. This position is indicated separately in the internal representation, and floating-point representation can thus be thought of as a computer realization of scientific notation. Operations performed by FPU 110 on floating point numbers can include, for example, addition, subtraction, multiplication, division, and square root. Results of operations performed by FPU 110 are stored in floating point registers 120.

In one embodiment, FPU 110 includes a set of enhancements 115 to implement recycling of error bits resulting from FPU calculations by the FPU 110. The FPU recycle error bits (REBits) enhancements 115 make the error of each floating point instruction performed by FPU 110 available in a dedicated register. For example, the error of each floating point instruction may be made available for access by other components of a computer system executing the processing device 100, such as by applications executed by processing device 100.

In one embodiment, the error of the floating point instruction includes a difference between the finite-precision result produced by the FPU 110 and the actual infinite-precision result of the operation. As will be explained in more detail below, the actual infinite-precision result is a result of an FPU 110 operation that is actually competed by the FPU 110, but then rounded or converted to another value due to shifting and/or alignment performed by the FPU 110 to comply with architectural constraints of the FPU 110 (such as register size of the FPU, and so on). In one embodiment, the dedicated register receiving the error result is illustrated as floating point error register (FPERR) 125. The enhancements 115 to FPU 110 may include, but are not limited to, the addition of hardware, such as registers, shifters, bit manipulation logic, and combinational logic for control. These enhancements 115 enable FPU 110 to obtain and output the error results of its FPU calculation, instead of ignoring and throwing this error out.

Figure 2:
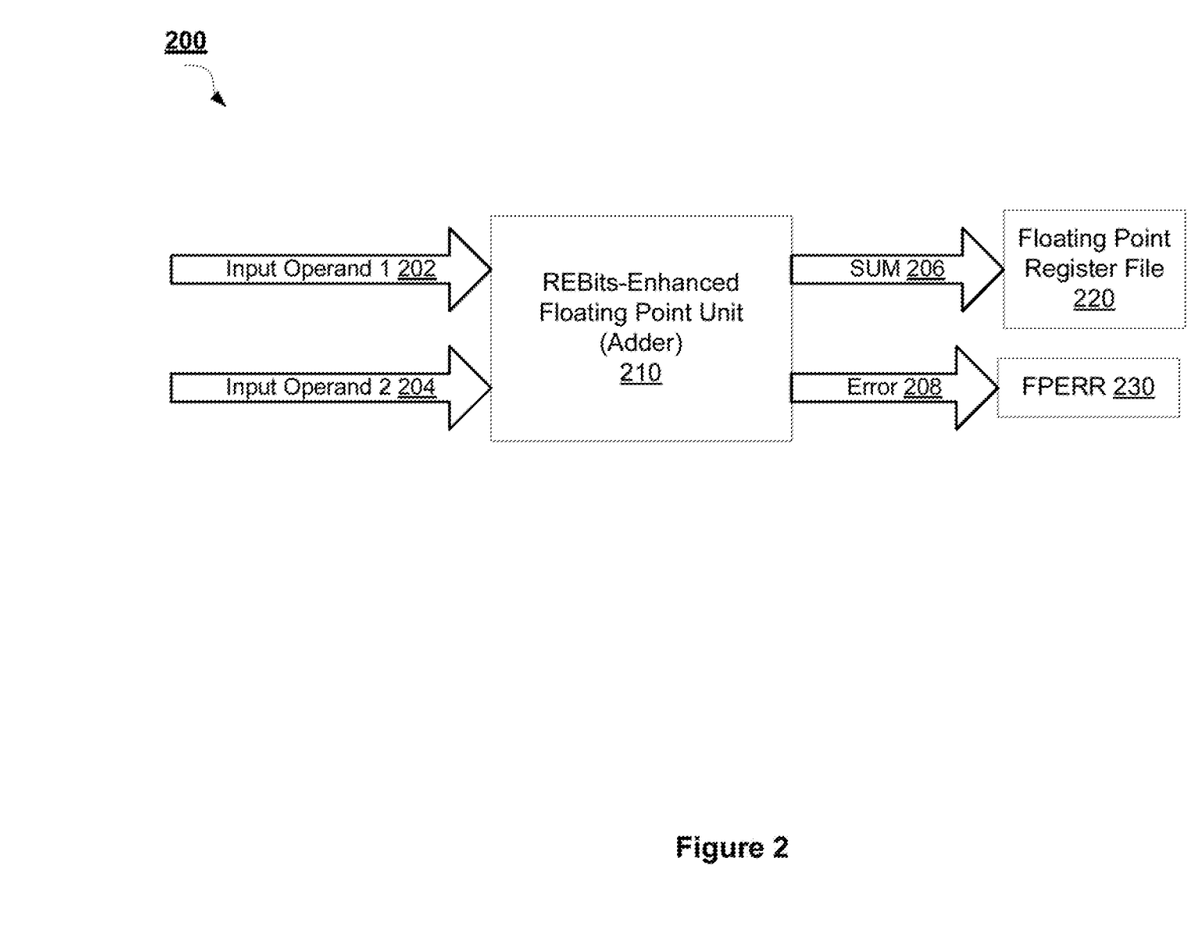
FIG. 2 is a block diagram depicting one embodiment of a floating point addition operation performed by a FPU that is enhanced for recycling error bits.

FIG. 2 is a block diagram depicting one embodiment of a floating point addition operation 200 performed by an FPU that is enhanced for recycling error bits. A REBits-enhanced FPU 210 is shown. In one embodiment, REBits-enhanced FPU 210 is the same as FPU 110 with FPU REBits enhancements 115 described with respect to FIG. 1. Although floating point addition is depicted in FIG. 2, recycling errors bits can also be used for floating point subtraction, floating point multiplication, floating point division, and other floating point operations.

In one embodiment, REBits-enhanced FPU 210 executes a floating point add instruction (fpadd) on two input operands, input operand 1 202 and input operand 2 204. As a result of executing the fpadd instruction, REBits-enhanced FPU 210 produces a sum 206 that is written to an architectural register 220 that is specified in the fpadd instruction.

Furthermore, in embodiments of the disclosure, another floating point value, the error 208, is written to a dedicated error register, FPERR 230. The error of the floating point instruction may include a difference between the finite-precision result produced by the FPU 210 and the actual infinite-precision result of the operation.

In one embodiment, the value of FPERR 230 is overwritten by every fpadd instruction. As a result, a programmer who wishes to use this error data should move it from FPERR 230 to a regular floating point register, before the next fpadd instruction is executed. If the ISA, such as ISA 106 of FIG. 1, has unused register specifier bits in its floating point move instruction, then the move from FPERR instruction may operate similar to any other move instruction of the processing device 100. Otherwise, a new instruction may be added to the ISA 106 that moves the contents of FPERR 230 to a specified floating point register.

Referring back to FIG. 1, ISA 106 may support multiple fpadd precisions, including 32-bit and 64-bit, to name a few examples. In one embodiment, a dedicated FPERR register 125 exists for each level of bit precision. For example, an FPERR32 register for 32-bit FPU precision operations and an FPERR64 register for 64-bit FPU operations, and so on. In some embodiments, ISA 106 may support packed floating point precision operations. With packed N-bit arithmetic, each FPERR register may be treated as k N/k-bit floating point values, where k is specified in the floating point operation instruction. For example, a 128-bit register could be interpreted as 2 64-bit values or 4 32-bit values. For embodiments of REBits, such packing is extended to the FPERR register 125. For example, FPERR 125 is interpreted as k N/k-bit floating point error values.

In some embodiments, the operations of FPU 110 produce non-compliant results, such as overflow or underflow, infinity, or a Not-A-Number (NaN), to name a few examples. However, these situations do not directly affect REBits, because the error is never infinity or NaN. If the sum is infinity or NaN, the error value is irrelevant.

Figure 3:
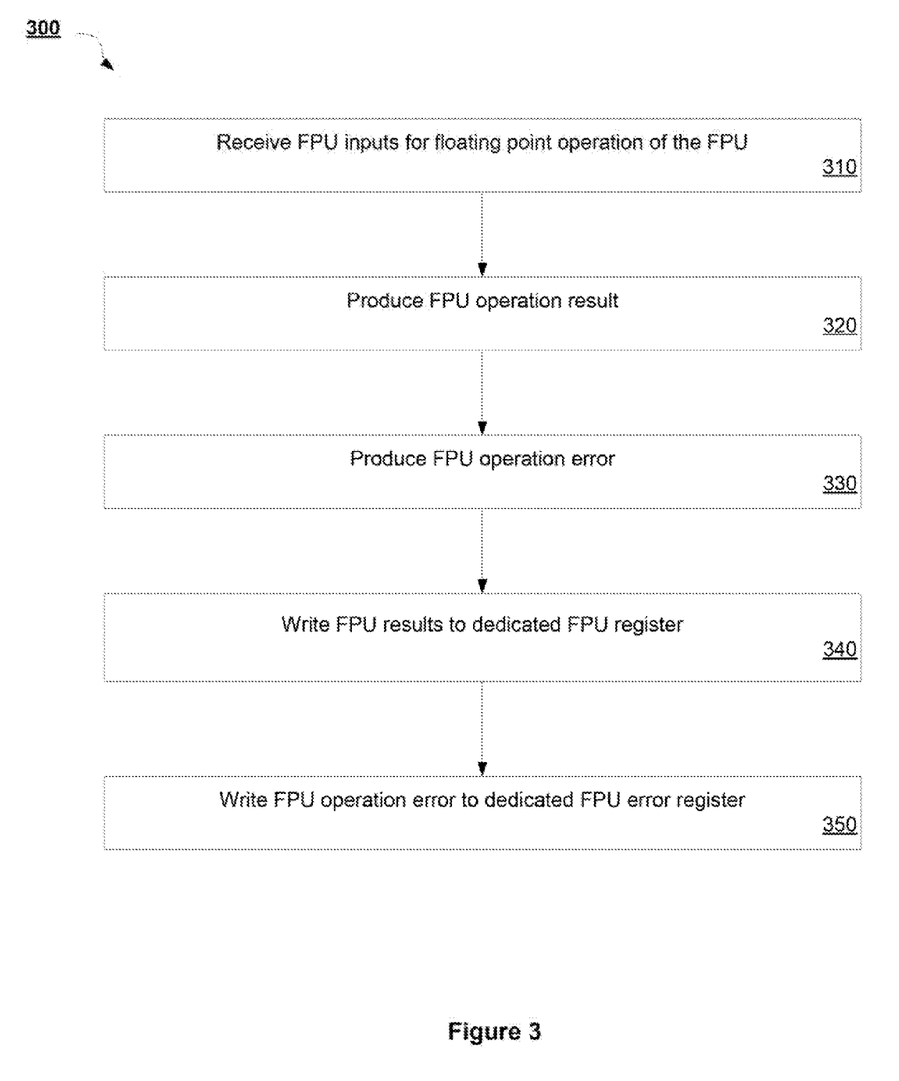
FIG. 3 is a flow diagram illustrating a method for recycling errors bits in a FPU according to an embodiment of the disclosure.

FIG. 3 is a flow diagram illustrating a method 300 for recycling errors bits in an FPU according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by processing device 100, and more specifically REBits-enhanced FPU 110, 115 of FIG. 1.

Method 300 begins at block 310 where floating point inputs for a floating point operation performed by the FPU are received. In one embodiment, the FPU operation may include addition, subtraction, multiplication, division, square root, and so on. Then at block 320 a result of the FPU operation is produced. The result of the FPU operation also produces an error value at block 330. At block 340, the FPU result is written to a dedicated FPU register of the processing device. Subsequently, at block 350, the FPU operation error is written to a dedicated FPU error register.

Figure 4:
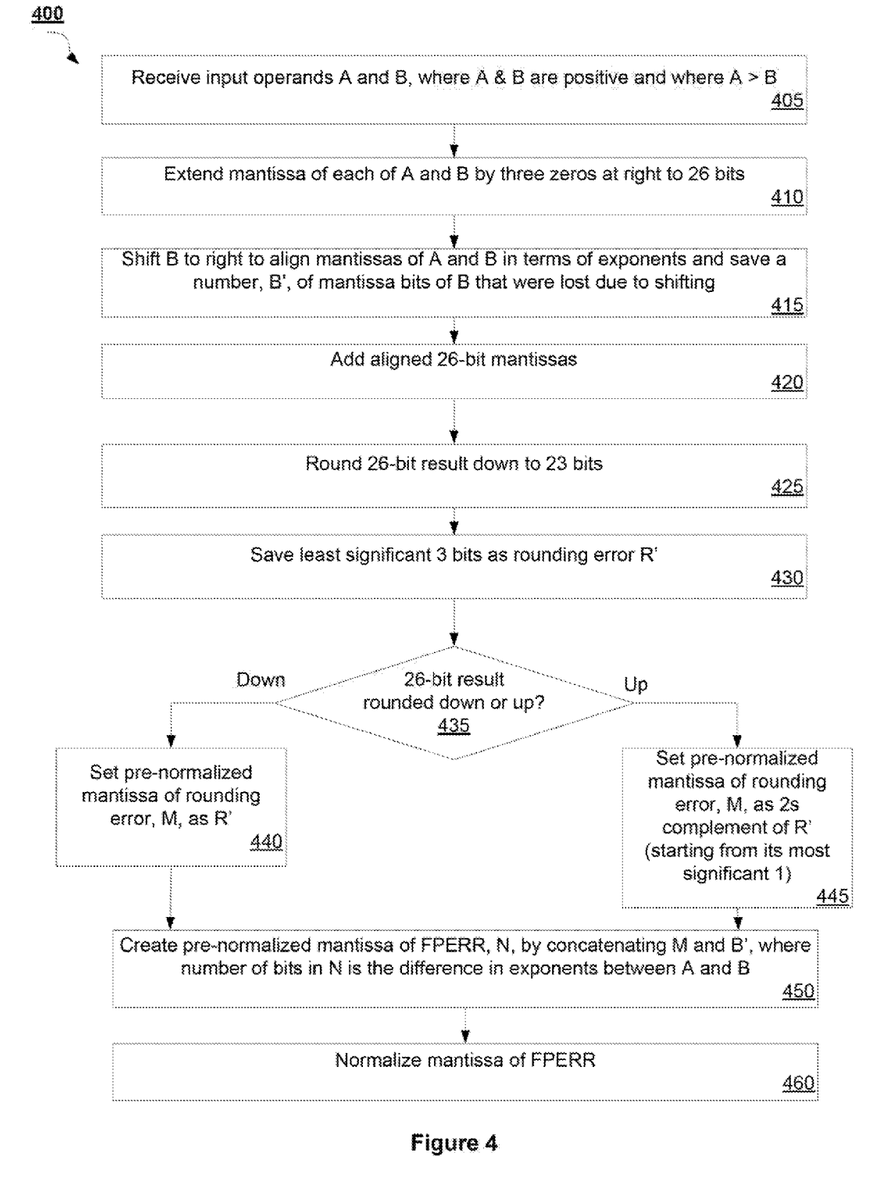
FIG. 4 is a flow diagram illustrating a method for an FPU add operation that recycles error bits utilizing a 32-bit hardware implementation according to an embodiment of the disclosure.

FIG. 4 is a flow diagram illustrating a method 400 for an FPU add (fpadd) operation that recycles error bits utilizing a 32-bit hardware implementation according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by a REBits-enhanced FPU of a processing device, such as REBits-enhanced FPU 210 of FIG. 2.

Method 400 begins at block 405 where input operands A and B are received at an FPU dedicated to performing a floating point add operation (fpadd). Assume that A and B are positive values and that A>B. For example, A may be the value 8739094 and B may be the value 20.5 IEEE 754 standard uses 23 bits to represent the fraction value (mantissa) and 8 bits to represent the exponent value and one bit to represent the sign (positive or negative) of the exponent value. As a result, 23+8+1 adds to 32 bits, which is the number of bits in a 32-bit machine utilized for method 400. A mantissa (also known as a coefficient or significand) is part of a floating point number that includes its significant digits. For example, the number 123.45 can be represented as a decimal floating point number with an integer mantissa of 12345 and an exponent of −2: $12345 \times 10^{-2}$. This same value can also be represented in normalized form with a fractional coefficient of 1.2345 and an exponent of +2: $1.2345 \times 10^{+2}$.

With respect to examples A and B, the 32-bit value representing A is 01001011000010101011001000010110, and the 32-bit value representing B is 01000001101001000000000000000000. Within the 32-bit value for A, the most significant bit, 0, represents the sign of A (positive). The following eight bits, 10010110, represent the exponent value of A, which is equal to 23. Then, the last 23 bits of A, 00001010101100100010110, represent the mantissa of A. Similarly, within the 32-bit value of B, the most significant bit, 0, represents the sign of B (positive). The next eight bits, 10000011, represent the exponent value of B, which is equal to 4. The last 23 bits of B, 01001000000000000000000, represent the mantissa of B.

At block 410, the mantissas of A and B are both extended by three zeros at the right of the values, to become 26-bit values. Then, at block 415, B is shifted to the right to align the mantissas of A and B in terms of their associated exponents. With respect to the above example values of A and B, the 26-bit mantissa of A (with the implicit one not shown) may then become 00001010101100100010110000, and the 26-bit mantissa of B, aligned to the mantissa of A is 00000000000000000010100100. Note that the difference in exponents between the example A and B is 19 (23−4), so the 26-bit mantissaa value of B was shifted to the right by 19 to align A and B.

Due to the shifting, one or more mantissa bits of B may be discarded by the FPU operational logic and these discarded bits are saved as the value B' at block 415. B' may be the value 0. In one embodiment, the REBits enhancements to the FPU (e.g., additional hardware added to the FPU to implement REBits) are utilized to save this discarded data at the FPU.

Subsequently, at block 420, the aligned 26-bit mantissas of A and B are added together. Referring to the example values of A and B, the resulting mantissa of the summation of their 26-bit mantissa values from above is 00001010101100100101010100. At block 425, the 26-bit result of the addition operation is rounded to a 23-bit result. The least significant 3 bits of the original 26-bit result is then saved as rounding error R' at block 430. Continuing with the example values from above, R' is the bit value 100.

Then, at decision block 435, it is determined whether the 26-bit addition operation result was rounded up or down. In the provided example, the 26-bit result is rounded down. If the result was rounded down, then method 400 proceeds to block 440, where a pre-normalized mantissa of the rounding error, M, is set to the value of R'. On the other hand, if the 26-bit result was rounded up, then method 400 proceeds to block 445 where the pr-normalized mantissa of rounding error, M, is set as 2s complement of rounding error R', starting from the most significant bit that is a one. In the provided example, the rounding error M is set to R', which is the bit value 100.

From either of blocks 440 and 445, method 400 proceeds to block 450 where a pre-normalized mantissa of the floating point error (FPERR), N, is created by concatenating M (the rounding error) and B' (lost bits of B due to shifting). Note that the number of bits in N is equal to the difference in the exponent values of A and B. For example, the FPERR, N, is represented as the value 0.5, which is the bit value 00111111000000000000000000000000.

Lastly, at block 460, the mantissa of FPERR (N) is normalized. As part of this normalization, the exponent of FPERR (N) is equal to the exponent of the sum result, minus the difference between the exponents values of A and B, minus the difference between 23 (the original bit size of mantissas of A and B) and the position of the leading 1 in the FPERR (N). In addition, the sign of FPERR (N) is set as positive if the 26-bit result was rounded down at decision block 435, and is set as negative if rounded up at decision block 435. In the provided example for method 400, the normalized value of FPERR (N) is equal to 0.5

It should be noted that method 400 is a single example of recycling error bits in an FPU using a floating point add operation in 32-bit hardware. Method 400 may be accordingly expanded for other implementations of FPU operations and hardware architectures for purposes of recycling error bits from the FPU.

Table 1 illustrates an example comparison between a native Double-Double FPU addition operation in a 64-bit architecture versus the same Double-Double FPU addition operation utilizing REBits enhancements as described with respect to embodiments of the disclosure. The native Double-Double FPU operation without REBits enhancements is shown in the left column, and the REBits-enhanced Double-Double FPU operation of embodiments of the disclosure is shown in the right column.

TABLE 1

| Native Double-Double addition | Double-Double addition with REBits |
|---|---|
| ```
struct dd{
  double lo, hi;
}
dd_add(dd X, dd Y) {
  double s1, s2, t1, t2;
  s1 = sum(X.hi, Y.hi, &s2);
  t1 = sum(X.lo, Y.lo, &t2);
  s2 += t1;
  s1 = quick_sum(s1, s2, &s2);
  s2 += t2;
  s1 = quick_sum(s1, s2, &s2);
  return dd(s1, s2);
}
double quick_sum(double a, double b, double &err) {
  double s = a + b;
  *err = b − (s − a); // infer error
  return s;
}
double sum(double a, double b, double &err){
  double s = a + b;
  double bb = s − a;
  *err = (a−(s−bb)) + (b−bb); // infer error
  return s;
}
``` | ```
dd_add(dd X, dd Y){
  double s1, s2, t1, t2;
  s1 = X.hi + Y.hi
  s2 = FPERR64
  t1 = X.lo + Y.lo
  t2 = FPERR64
  s2 += t1
  s1 = s1 + s2
  s2 = FPERR64
  s2 += t2
  s1 = s1 + s2
  s2 = FPERR64
  return dd(s1, s2)
}
``` |

Figure 5:
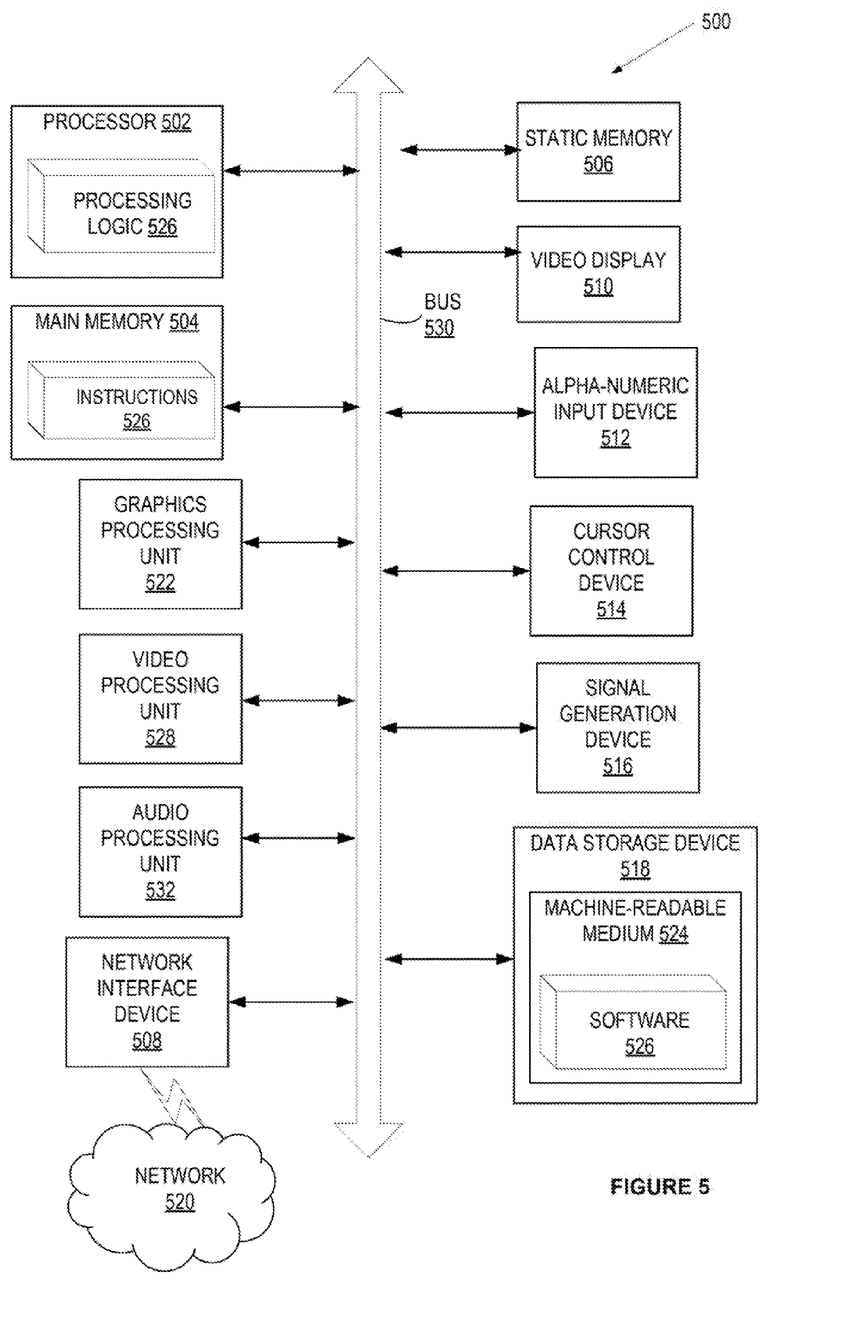
FIG. 5 illustrates a block diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In one embodiment, processing device 502 may include one or processing cores. The processing device 502 is configured to execute the processing logic 526 for performing the operations and steps discussed herein. In one embodiment, processing device 502 is the same as processing device 100 described with respect to FIG. 1 that implements recycling error bits in an FPU. For example, processing device 502 may include a REBits-enhanced FPU, such as FPU 110, 115 of FIG. 1.

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker). Furthermore, computer system 500 may include a graphics processing unit 522, a video processing unit 528, and an audio processing unit 532.

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 utilizing an FPU of processor 502 that recycles error bits, such as described with respect to processing device 100 in FIG. 1, and/or a software library containing methods that call the above applications. While the machine-accessible storage medium 528 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

In the foregoing description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "generating", "writing", "accessing", "moving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A system, comprising:
   a memory; and
   a processing device communicably coupled to the memory, the processing device comprising a floating point unit (FPU) to:
   generate a result value from applying an operation on floating point number inputs to the FPU;
   generate an error value using the result value;
   write the result value to a first register of the processing device dedicated to storing results from the operation of the FPU; and
   write the error value to a second register of the processing device dedicated to storing errors from the operation of the FPU, wherein the second register is separate from the first register.

2. The system of claim 1, wherein the error value is accessible from the second register.

3. The system of claim 1, wherein an instruction set architecture (ISA) of the processing device comprises an instruction to move the error value from the second register.

4. The system of claim 3, wherein the instruction to move the error value from the second register is utilized by one or more software applications executed by the processing device to access the error value.

5. The system of claim 1, wherein the second register is dedicated to one of a plurality of precisions of the FPU.

6. The system of claim 5, wherein the plurality of precisions comprise at least one of a 32-bit precision, a 64-bit precision, or a 128-bit precision.

7. The system of claim 1, wherein in response to the FPU supporting a packed N-bit architecture, the second register comprises k N/k bit floating point values, where k is specified in an instruction to the FPU to perform the operation.

8. The system of claim 1, wherein the error value is a result of at least one of a rounding error of the operation or a binary/decimal conversion of the operation.

9. A method, comprising:
   generating, by a floating point unit (FPU) of a processing device, a result value from applying an operation on floating point number inputs to the FPU;
   generating, by the FPU, an error value using the result value;
   writing, by the FPU, the result value to a first register of the processing device dedicated to storing results from the operation of the FPU; and
   writing, by the FPU, the error value to a second register of the processing device dedicated to storing errors from the operation of the FPU, wherein the second register is separate from the first register.

10. The method of claim 9, wherein the error value is accessible from the second register.

11. The method of claim 9, wherein an instruction set architecture (ISA) of the processing device comprises an instruction to move the error value from the second register.

12. The method of claim 11, wherein the instruction to move the error value from the second register is utilized by one or more software applications executed by the processing device to access the error value.

13. The method of claim 9, wherein the second register is dedicated to one of a plurality of precisions of the FPU.

14. The method of claim 13, wherein the plurality of precisions comprise at least one of a 32-bit precision, a 64-bit precision, or a 128-bit precision.

15. The method of claim 9, wherein in response to the FPU supporting a packed N-bit architecture, the second register comprises k N/k bit floating point values, where k is specified in an instruction to the FPU to perform the operation.

16. A non-transitory machine-readable storage medium including data that, when accessed by a machine, cause the machine to perform operations comprising:
   accessing, by a processing device of the machine, a first dedicated register for storing an error value resulting from a result value from applying a first floating point operation performed on input operands to a floating point unit (FPU) of the processing device, the FPU performing the first floating point operation on the input operands, wherein the result value is stored in a second dedicated register and the second dedicated register is separate from the first dedicated register;
   moving, by the processing device, the error value from the first dedicated register to a floating point register of the processing device; and
   utilizing, by the processing device, the error value stored in the floating point register as part of a software instruction executed by the processing device.

17. The non-transitory machine-readable storage medium of claim 16, wherein the error value is accessible from the first dedicated register.

18. The non-transitory machine-readable storage medium of claim 16, wherein the error value is moved prior to executing a second floating operation written in the floating point register.

19. The non-transitory machine-readable storage medium of claim 16, wherein the first dedicated register is associated with one of a plurality of precisions of the FPU.

20. The non-transitory machine-readable storage medium of claim 16, wherein in response to the FPU supporting a packed N-bit architecture, the second register comprises k N/k bit floating point values, where k is specified in an instruction to the FPU to perform the operation.

* * * * *